United States Patent
Fujita et al.

(10) Patent No.: US 11,953,816 B2
(45) Date of Patent: Apr. 9, 2024

(54) WAVELENGTH CONVERSION PLATE, LIGHT SOURCE DEVICE, AND IMAGE PROJECTION APPARATUS

(71) Applicants: Kazuhiro Fujita, Tokyo (JP); Yohei Takano, Kanagawa (JP); Kasumi Nakamura, Kanagawa (JP)

(72) Inventors: Kazuhiro Fujita, Tokyo (JP); Yohei Takano, Kanagawa (JP); Kasumi Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 44 days.

(21) Appl. No.: 17/872,022

(22) Filed: Jul. 25, 2022

(65) Prior Publication Data

US 2023/0042973 A1     Feb. 9, 2023

(30) Foreign Application Priority Data

Aug. 6, 2021    (JP) .................................. 2021-129825
Jan. 17, 2022    (JP) .................................. 2022-005229

(51) Int. Cl.
     *G03B 21/20*        (2006.01)

(52) U.S. Cl.
     CPC ......... *G03B 21/204* (2013.01); *G03B 21/208* (2013.01)

(58) Field of Classification Search
     CPC ............................ G03B 21/204; G03B 21/208
     USPC .......................................................... 353/31
     See application file for complete search history.

(56) References Cited

U.S. PATENT DOCUMENTS

| | | |
|---|---|---|
| 2014/0104583 A1 | 4/2014 | Osaka |
| 2014/0198301 A1 | 7/2014 | Yagyu et al. |
| 2017/0299953 A1 | 10/2017 | Maeda et al. |
| 2018/0218711 A1 | 8/2018 | Suzuki et al. |
| 2018/0252916 A1 | 9/2018 | Nakamura et al. |
| 2018/0272538 A1 | 9/2018 | Takahashi et al. |

(Continued)

FOREIGN PATENT DOCUMENTS

| | | |
|---|---|---|
| JP | 2013-195841 | 9/2013 |
| JP | 5737769 | 6/2015 |

(Continued)

OTHER PUBLICATIONS

Application No. 2020-202828 filed Dec. 7, 2020.
Application No. 2020-197461 filed Nov. 27, 2020.
Application No. 2021-129825 filed Aug. 6, 2021.

*Primary Examiner* — Jerry L Brooks
(74) *Attorney, Agent, or Firm* — XSENSUS LLP

(57) ABSTRACT

A wavelength conversion plate includes a conversion region and a reflection region on a base surface. The conversion region includes a wavelength conversion member configured to receive excitation light and generate a color different from a color of the excitation light. The reflection region is configured to reflect the excitation light. The reflection region includes a transmissive diffusion surface, a transmissive layer, and a reflection surface. The transmissive diffusion surface is configured to diffuse the excitation light. The transmissive layer is configured to transmit the excitation light. The reflection surface is configured to reflect the excitation light. The transmissive diffusion surface is in a position separate from a surface closer to the base surface, of the wavelength conversion member, toward a direction from which the excitation light is incident.

20 Claims, 9 Drawing Sheets

(56) References Cited

U.S. PATENT DOCUMENTS

| | | |
|---|---|---|
| 2019/0084419 A1 | 3/2019 | Suzuki et al. |
| 2019/0129288 A1 | 5/2019 | Maeda et al. |
| 2019/0250489 A1* | 8/2019 | Ikeda .................. H04N 9/3158 |
| 2019/0285884 A1 | 9/2019 | Fujita et al. |
| 2019/0285885 A1 | 9/2019 | Satoh et al. |
| 2019/0302589 A1 | 10/2019 | Abe |
| 2019/0304402 A1 | 10/2019 | Suzuki et al. |
| 2020/0150433 A1 | 5/2020 | Satoh et al. |
| 2020/0183157 A1 | 6/2020 | Suzuki et al. |
| 2020/0201158 A1 | 6/2020 | Maeda et al. |
| 2021/0136336 A1 | 5/2021 | Takano et al. |
| 2021/0200075 A1 | 7/2021 | Nakamura et al. |
| 2022/0066177 A1 | 3/2022 | Takano et al. |
| 2022/0097414 A1 | 3/2022 | Hirayama et al. |
| 2022/0118553 A1 | 4/2022 | Miyanishi et al. |
| 2022/0171267 A1 | 6/2022 | Takano et al. |
| 2022/0179298 A1 | 6/2022 | Fujita et al. |
| 2023/0042973 A1 | 2/2023 | Fujita et al. |

FOREIGN PATENT DOCUMENTS

| | | |
|---|---|---|
| JP | 2017-181602 | 10/2017 |
| JP | 6305009 | 4/2018 |
| JP | 2019-184628 | 10/2019 |
| JP | 2021-092761 | 6/2021 |
| JP | 2022-085665 A | 6/2022 |
| JP | 2022-090609 A | 6/2022 |
| JP | 2023-024245 A | 2/2023 |

* cited by examiner k<h<2k

WAVELENGTH CONVERSION PLATE, LIGHT SOURCE DEVICE, AND IMAGE PROJECTION APPARATUS

CROSS-REFERENCE TO RELATED APPLICATIONS

The present application claims priority under 35 U.S.C. § 119 to Japanese Patent Application No. 2021-129825, filed on Aug. 6, 2021 and Japanese Patent Application No. 2022-005229, filed on Jan. 17, 2022. The contents of which are incorporated herein by reference in their entirety.

BACKGROUND OF THE INVENTION

1. Field of the Invention

The present invention relates to a wavelength conversion plate, a light source device, and an image projection apparatus.

2. Description of the Related Art

In recent years, a projector (image projection apparatus) that projects various kinds of video in an enlarged manner is widely used. The projector is an apparatus that causes light emitted from a light source to be condensed into a spatial optical modulation element (image display element), such as a digital mirror device (DMD) or a liquid crystal display element, and displays, as color video, emitted light (reflected light) that is modulated based on a video signal and that is emitted from the spatial optical modulation element on a screen.

Meanwhile, to project the color video, illumination light sources for at least three primary colors are needed, and it may be possible to generate all of the light sources as laser light sources; however, this configuration is not preferable because luminous efficiency of green laser and red laser is lower than blue laser. Therefore, a method of applying blue laser, as excitation light, to a fluorescent substance, and generating red light and green light from fluorescent light for which a wavelength is converted by the fluorescent substance is mainly used. In contrast, it is possible to use the excitation light as it is as the blue light, and therefore, there is a known technology related to an illumination apparatus that generates blue light and fluorescence in a temporal-sequential manner by adopting a part of a fluorescent substance base to which a fluorescent substance is applied as a section of a reflection region, and sequentially interchanging the reflection region and a region in which the fluorescent substance is arranged.

Japanese Patent No. 6305009 discloses a technology for arranging a diffuse reflection surface that diffuses and reflects light on a surface of a metal base material on which a fluorescent substance is arranged in a fluorescent wheel, and controlling light emission of a light source and an excitation light source in synchronization with a position of the diffuse reflection surface of the fluorescent substance relative to an irradiation position of the excitation light. Japanese Unexamined Patent Application Publication No. 2017-181602 discloses a technology for arranging, on a base, a light scattering layer in which micro scattering substances are scattered in a material.

However, according to the conventional diffusion structure for the reflection surface arranged on the wavelength conversion plate, a light emission position of the fluorescent substance (a surface of the fluorescent substance to which the excitation light is applied when viewed from a direction in which the excitation light is incident) and a diffusion position (a position of a transmissive diffusion surface through which the excitation light first passes when viewed from the side on which the excitation light is incident) are different, so that it is difficult to optimize light use efficiency of each of the fluorescence and the blue light that is the excitation light source, and it is difficult to improve use efficiency.

In addition, according to the conventional technology, the fluorescence travels inside the fluorescent substance from the surface of the fluorescent substance, is slightly blurred relative to an irradiation size of the excitation light that is applied to the surface of the fluorescent substance, and has a larger fluorescence emission size than the irradiation size of the excitation light. There is a difference between the fluorescence emission size and a light emission size of the excitation light on the transmissive diffusion surface for the excitation light. In other words, according to the conventional technology, there is a problem in that, in an optical system that captures light from the fluorescence and the blue light that is the excitation light source, it is difficult to perform optimization in a simultaneous manner and it is difficult to improve the use efficiency.

SUMMARY OF THE INVENTION

According to an aspect of the present invention, a wavelength conversion plate includes a conversion region and a reflection region on a base surface. The conversion region includes a wavelength conversion member configured to receive excitation light and generate a color different from a color of the excitation light. The reflection region is configured to reflect the excitation light. The reflection region includes a transmissive diffusion surface, a transmissive layer, and a reflection surface. The transmissive diffusion surface is configured to diffuse the excitation light. The transmissive layer is configured to transmit the excitation light. The reflection surface is configured to reflect the excitation light. The transmissive diffusion surface is in a position separate from a surface closer to the base surface, of the wavelength conversion member, toward a direction from which the excitation light is incident.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
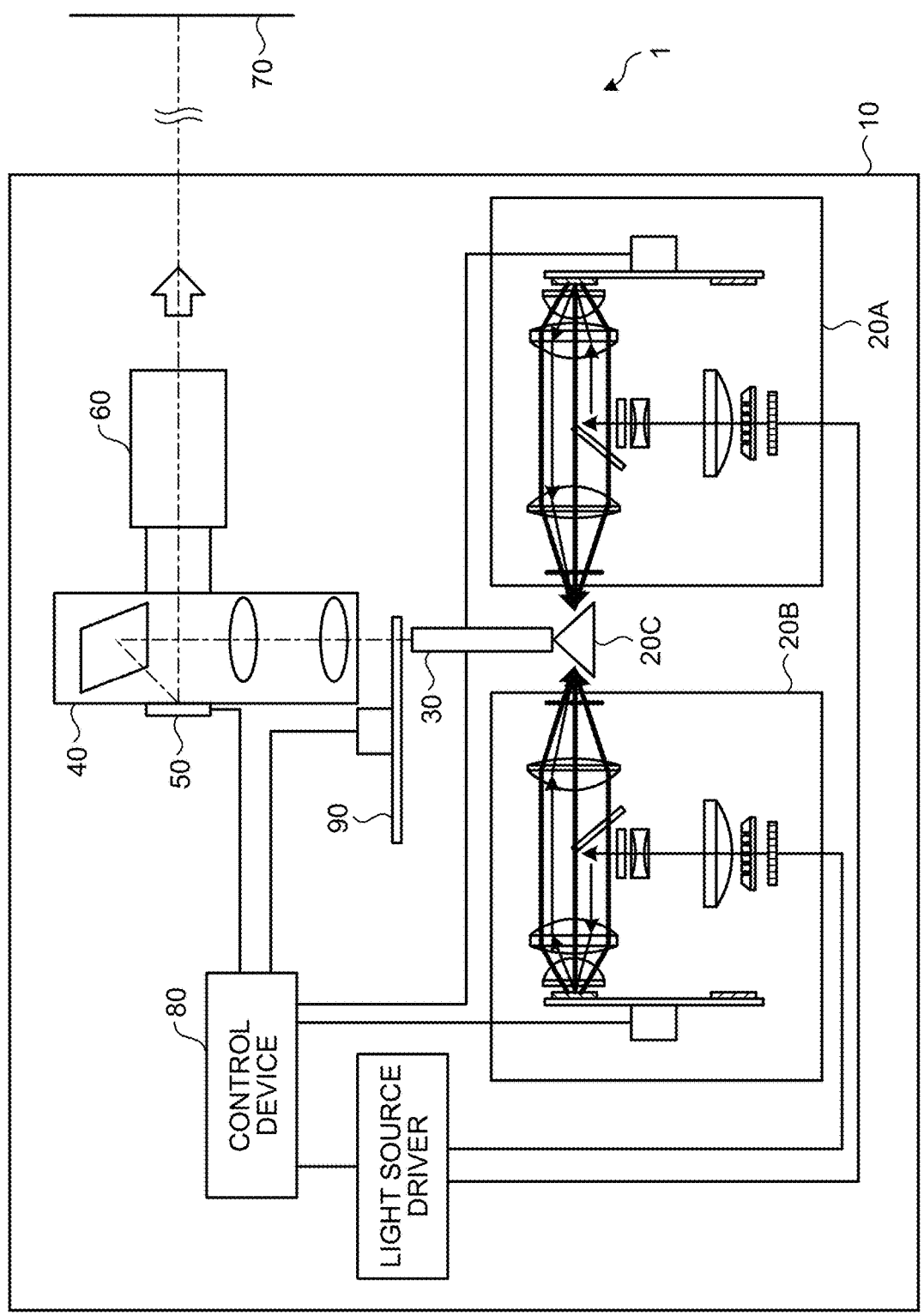
FIG. 1 is a schematic configuration diagram illustrating a projector according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a wavelength conversion plate, a light source device, and an image projection apparatus capable of improving light use efficiency.

Embodiments of a wavelength conversion plate, a light source device, and an image projection apparatus will be described in detail below with reference to the accompanying drawings.

First Embodiment

FIG. 1 is a schematic configuration diagram illustrating a projector 1 according to a first embodiment.

The projector (image projection apparatus) 1 includes a housing 10, a light source device 20, a light homogenizing element 30, an illumination optical system 40, an image forming element (image display element) 50, a projection optical system 60, a control device 80, and a color wheel 90.

The housing 10 houses the light source device 20, the light homogenizing element 30, the illumination optical system 40, the image forming element 50, the projection optical system 60, the control device 80, and the color wheel 90.

The light source device 20 emits light with wavelengths corresponding to each of RGB colors, for example. The light source device 20 includes a light source unit 20A, a light source unit 20B, and an optical path synthesizing element 20C as a synthesizing unit. The light source unit 20A and the light source unit 20B have the same configurations, and emit light fluxes with predetermined shapes. Internal configurations of the light source unit 20A and the light source unit 20B will be described in detail later. The light fluxes emitted from the light source unit 20A and the light source unit 20B are deflected by the optical path synthesizing element 20C and enter an incident side surface of the light homogenizing element 30. In the present embodiment, a prism is illustrated as an example of the optical path synthesizing element 20C, but embodiments are not limited to this example.

As illustrated in FIG. 1, the projector 1 causes the light fluxes, which are emitted from the light source unit 20A and the light source unit 20B in opposite directions and which are being condensed, to be reflected and deflected by two reflecting portions (the optical path synthesizing element 20C in FIG. 1), which form an angle of about 90 degrees, such that the light fluxes are reflected in the same direction, and the condensed light fluxes are synthesized in an adjacent manner or a partly overlapping manner and simultaneously input to the light homogenizing element 30.

Meanwhile, in the present embodiment, the example is illustrated in which the light source device 20 includes the two light source units 20A and 20B, but embodiments are not limited to this example, and it may be possible to use more than two light sources, for example, four light sources to synthesize the light.

The light homogenizing element 30 homogenizes the light emitted from the light source device 20 by mixing light. More specifically, the light homogenizing element 30 causes the light flux that is input from the incident side surface to propagate inside the light homogenizing element 30 while repeatedly reflecting the light flux, and outputs the light flux from an emission surface. The light homogenizing element 30 internally reflects the light flux, which is input form the incident side surface, a number of times, and forms a uniform surface light source on the output surface. As the light homogenizing element 30, for example, a hollow light tunnel in which four mirrors are combined on an inner surface, a prism-shaped rod integrator that is made of a transparent material, such as glass, a fly-eye lens, or the like may be used. For example, if a light tunnel is adopted as the light homogenizing element 30, by adopting approximately the same aspect ratio as that of the image forming element 50, an outlet of the light tunnel has the same shape as a shape that is projected on a surface of the image forming element 50, so that it is possible to efficiently illuminate the surface of the image forming element 50 without any waste.

The illumination optical system 40 approximately uniformly illuminates the image forming element 50 with the light that is homogenized by the light homogenizing element 30. The illumination optical system 40 includes, For example, one or more lenses, one or more reflecting surfaces, and the like.

The image forming element 50 includes a light bulb, such as a digital micromirror device (DMD), a transmissive liquid crystal panel, or a reflective liquid crystal panel. The image forming element 50 modulates the light that is emitted by the illumination optical system 40 (light from a light source optical system of the light source device 20) and forms an image.

The control device 80 performs switching in units of pixels on the surface of the image forming element 50 by, for example, reflecting or transmitting the illumination light applied to the image forming element 50 in accordance with an input image, and guides the illumination light to the projection optical system 60.

The projection optical system 60 projects the image formed by the image forming element 50 on a screen (projection target screen) 70 in an enlarged manner. The projection optical system 60 includes, for example, one or more lenses. The projection optical system 60 has a conjugation relationship such that the image on the surface of the image forming element 50 is formed, as an enlarged image, at a certain position on the desired screen (projection target screen) 70, and therefore projects, in an enlarged manner, the image that is spatially modulated on the surface of the image forming element 50.

In addition, at a light outlet of the light homogenizing element 30, the color wheel 90 that has a function to switch between color filters so as to extract at least a blue light component, a green light component, and a red light component is arranged. The color wheel 90 synchronizes rotation of wavelength conversion elements 26 (see FIGS. 2A and 2B) used in both of the light source unit 20A and the light source unit 20B with rotation of the color wheel 90 to drive switching between the color filters in a synchronized manner, and displays the image on the surface of the image forming element 50 in accordance with a switching timing, to thereby sequentially display images of single colors. A time taken for the switching as described above is faster than an eye response speed, so that the images are recognized as a color image.

Figure 2A:
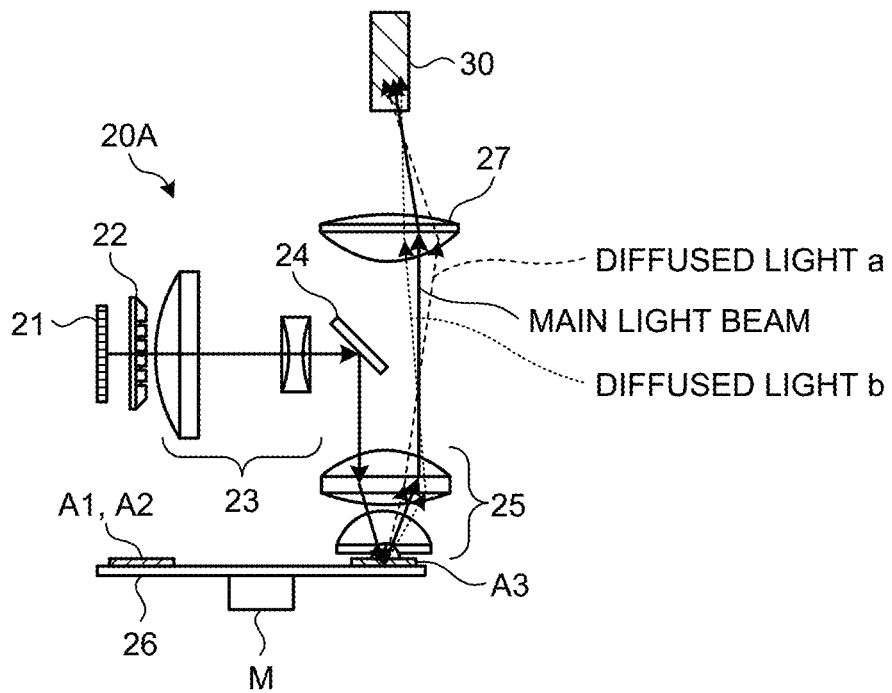
FIGS. 2A and 2B are schematic diagrams illustrating a configuration of a light source unit.
Figure 2B:
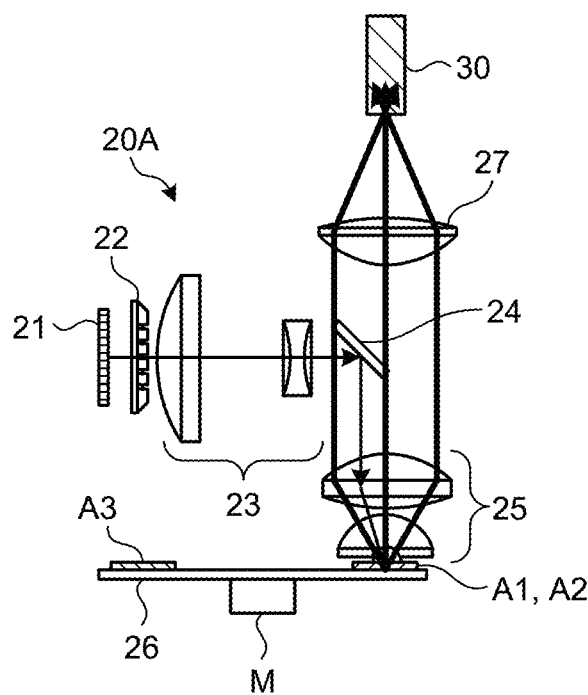

FIGS. 2A and 2B are schematic diagrams illustrating a configuration of the light source unit 20A. Meanwhile, the light source unit 20B has the same configuration. FIG. 2A illustrates a state at the time blue laser light (first color light) is generated, and FIG. 2B illustrates a state at the time fluorescent light (second color light) is generated.

The light source unit 20A (20B) includes a laser light source (excitation light source) 21, a collimator lens 22 that is arranged in accordance with each of the light sources, a first lens group 23, a dichroic mirror 24, a second lens group 25, the wavelength conversion element 26 that is a wavelength conversion plate, and a third lens group 27, all of which are arranged in sequence in a light propagation direction. For example, the components except for the laser light source 21 in the light source device 20 constitute the "light source optical system". In the light source unit 20A (20B), all of the units as described above are arranged in propagation order of the excitation light that is emitted from the laser light source 21.

The laser light source 21 includes a plurality of light sources (light emitting points). As the laser light source 21, what is called a laser diode is used. In FIGS. 2A and 2B, six light sources that are arranged in a vertical direction are illustrated, but in reality, four rows in each of which the six light sources are arranged are arrayed in an orthogonal direction (depth direction) of the sheet of figure, so that 6×4=24 light sources are arranged in a two-dimensional manner. Each of the light sources of the laser light source 21 emits, as excitation light that excites the fluorescent substance included in the wavelength conversion element 26, for example, light in the blue band (blue laser light) in which a central wavelength of emission intensity is 440 nanometers (nm) to 465 nm.

The blue laser light (first color light) emitted from each of the light sources of the laser light source 21 is a linearly polarized light with a constant polarized state, and is arranged so as to become S-polarized light with respect to the dichroic mirror 24. The blue laser light emitted from each of the light sources of the laser light source 21 is coherent light. Further, the excitation light emitted from each of the light sources of the laser light source 21 is not limited to the light in the blue band, and light with a certain wavelength at which the fluorescent substance included in the wavelength conversion element 26 can be excited is satisfactory.

While the example is illustrated in which the laser light source 21 includes the plurality of light sources, it may be possible to adopt a single laser light source. Further, it may be possible to use, as the laser light source 21, a light source unit that is arranged in an array manner on a substrate, but embodiments are not limited to this example.

The 24 collimator lenses 22 are arranged in accordance with the 24 light sources of the laser light source 21. Each of the collimator lenses 22 adjusts the excitation light emitted from each of the light sources of the laser light source 21 so as to obtain parallel light. It is sufficient that the number of the collimator lens 22 corresponds to the number of the light sources of the laser light source 21, and may be increased or decreased in accordance with an increase or a decrease of the number of the light sources of the laser light source 21.

The excitation light emitted from the laser light source 21 is adjusted to approximately parallel light by the collimator lenses 22 that correspond to the respective light sources of the laser light source 21. The excitation light adjusted to approximately parallel light is reduced and converted to a thin light flux by the first lens group 23, and then guided to the dichroic mirror 24.

The dichroic mirror 24 is a glass plate having a parallel flat plate shape. An incident surface of the dichroic mirror 24 is coated so as to reflect S-polarized light (first polarized component) in a wavelength band of the excitation light guided from the first lens group 23, and transmit P-polarized light (second polarized component) in the wavelength band of the excitation light guided from the first lens group 23 and the fluorescent light (second color light) coming from the wavelength conversion element 26.

A center of the dichroic mirror 24 is shifted with respect to an optical axis of the second lens group 25, so that the excitation light is input in an inclined manner with respect to a normal line of the wavelength conversion element 26.

While the dichroic mirror 24 having a flat plate shape is used in the present embodiment, it may be possible to use a prism type. Further, in the present embodiment, the dichroic mirror 24 reflects the S-polarized light and transmits the P-polarized light in the wavelength band of the excitation light, but conversely, it may be possible to reflect the P-polarized light and transmit the S-polarized light in the wavelength band of the excitation light.

As illustrated in FIG. 2A, the excitation light that is reflected by the dichroic mirror 24 is guided to the wavelength conversion element 26 by the second lens group 25 that is a condensing optical system, and a desired condensing spot is formed on the wavelength conversion element 26. The excitation light that is reflected in a blue reflection region A3 (see FIGS. 3A to 3C) of the wavelength conversion element 26 transmits through the second lens group 25 again, passes through a side opposite to the dichroic mirror 24, of the optical axis of the second lens group 25, passes through the third lens group 27, is polarized by the optical path synthesizing element 20C, and enters the light homogenizing element 30. The light homogenizing element 30 homogenizes the incident light.

Figure 3A:
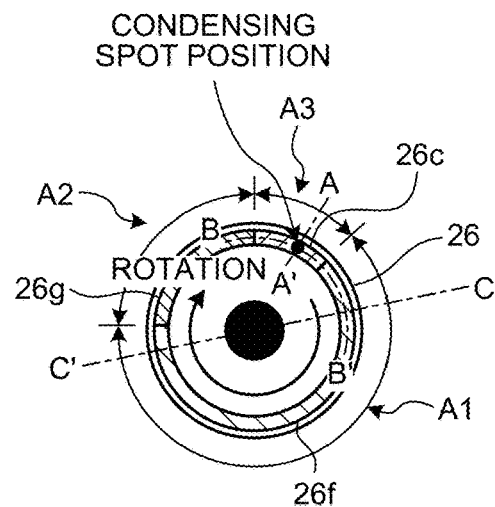
FIGS. 3A to 3C are diagrams illustrating an example of a configuration of a wavelength conversion element.
Figure 3B:
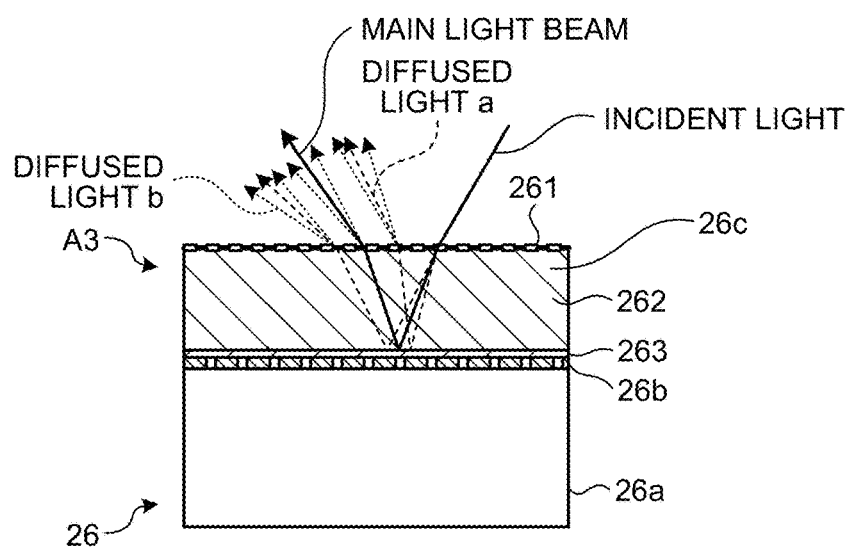
Figure 3C:
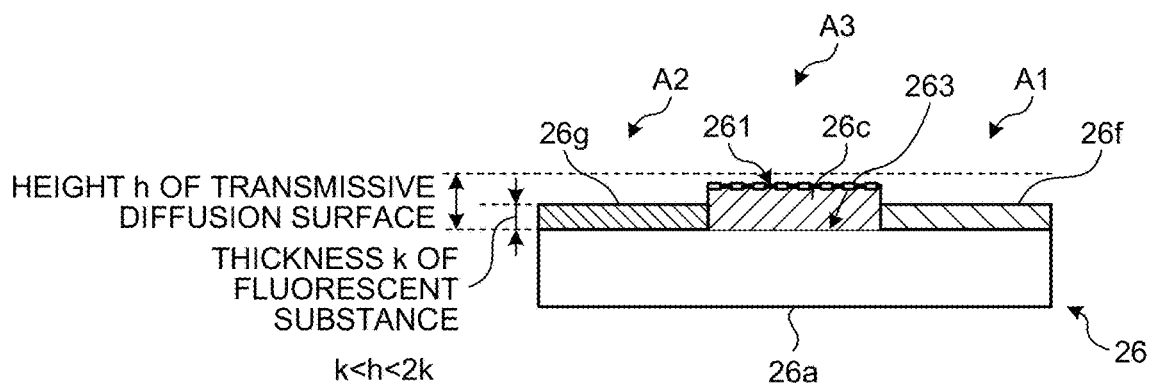

Furthermore, as illustrated in FIG. 2B, if the excitation light is incident on a fluorescent substance region (a yellow fluorescent substance region A1 and a green fluorescent substance region A2: see FIGS. 3A to 3C) of the wavelength conversion element 26, fluorescence for which a wavelength is converted upon reception of the excitation light is emitted at 360 degrees around a fluorescent molecule. The fluorescence that is emitted in the fluorescent substance region of the wavelength conversion element 26 includes a yellow component or a green component. Moreover, the excitation light that is reflected by a surface (base surface) of a base 26a of the wavelength conversion element 26 (see FIGS. 3A to 3C) passes through the fluorescent substance region (the yellow fluorescent substance region A1 and the green fluorescent substance region A2) again, and emits fluorescence with a Lambertian distribution at the surface of the fluorescent substance region (the yellow fluorescent substance region A1 and the green fluorescent substance region A2). The fluorescence that is emitted in the fluorescent substance region (the yellow fluorescent substance region A1 and the green fluorescent substance region A2) of the wavelength conversion element 26 is guided to the light homogenizing element 30 via the optical path synthesizing element 20C (omitted in FIGS. 2A and 2B). More specifically, the fluorescence is adjusted to approximately parallel light by the second lens group 25, refracted by the third lens group 27 so as to be condensed to the vicinity of the light homogenizing element 30, deflected by the optical path synthesizing element 20C, and enters the light homogenizing element 30.

FIGS. 3A to 3C are diagrams illustrating an example of a configuration of the wavelength conversion element 26.

FIG. 3A is a plan view of the wavelength conversion element 26. As illustrated in FIG. 3A, the wavelength conversion element 26 according to the present embodiment has a disk shape. The wavelength conversion element 26 is a wavelength conversion plate, in which three segments, such as the yellow fluorescent substance region (first wavelength conversion region) A1 that is a conversion region including a wavelength conversion member (yellow fluorescent substance) 26f, the green fluorescent substance region (second wavelength conversion region) A2 that is a conversion region including a wavelength conversion member (green fluorescent substance) 26g, and a blue reflection region in which the light emitted from the laser light source (excitation light source) 21 is reflected (in other words, a non-conversion region in which the light received from the laser light source (excitation light source) 21 is emitted without wavelength conversion) A3, are formed in a belt-like manner at desired angles around a periphery of the disk-shaped plate.

The yellow fluorescent substance region A1 is formed of, for example, the yellow fluorescent substance 26f that receives blue laser light as the excitation light and emits fluorescence in a yellow wavelength range. The green fluorescent substance region A2 is formed of, for example, the green fluorescent substance 26g that receives the blue laser light as the excitation light and emits fluorescence in a green wavelength range.

Meanwhile, in the present embodiment, the two kinds of fluorescent substances, i.e., the yellow fluorescent substance region A1 and the green fluorescent substance region A2, are used, but embodiments are not limited to this example. For example, it may be possible to use only the yellow fluorescent substance region A1 or it may be possible to add a red fluorescent substance region.

Meanwhile, the color wheel 90 includes the color filters for extracting desired color components from the fluorescent substance. The color wheel 90, by sequentially switching between the color filters, extracts a necessary component, such as a green component or a red component, from the fluorescence in a time-division manner. To sequentially switching between the color filters as described above, it is sufficient to arrange a segment for each of the color filters and performs rotation by a rotation motor such that the desired color filters are sequentially switched from one to the other.

Further, the disk-shaped wavelength conversion element 26 is rotated by a driving unit that is controlled by the control device 80, so that it is possible to sequentially move the yellow fluorescent substance region A1, the green fluorescent substance region A2, and the blue reflection region A3 in a periodic manner. Meanwhile, it is generally preferable to use a rotation motor M as the driving unit that is a moving mechanism. Furthermore, with the rotation drive of the driving unit, the wavelength conversion element 26 switches between the yellow fluorescent substance region A1, the green fluorescent substance region A2, and the blue reflection region A3 in the condensing spot that is a position at which the light is applied from the laser light source (excitation light source) 21, so that light with different wavelengths are emitted in a time-division manner.

Meanwhile, in the light source unit 20A (20B), a light absorbing or reflecting member is arranged on a wheel of the wavelength conversion element 26 or a member that supports and rotates the wheel, and rotation speeds of the two wavelength conversion elements 26 are equalized based on detection using a photo-coupler.

FIG. 3B is a cross-sectional view taken along A-A' in FIG. 3B. As illustrated in FIG. 3B, the wavelength conversion element 26 includes, in the blue reflection region A3, a transparent flat plate 26c that is a transparent flat plate member on the disk-shaped base 26a via a bonding layer 26b. Meanwhile, as described above, the laser light source 21 emits, as the excitation light, light in the blue band (blue laser light) in which a central wavelength of emission intensity is 440 nm to 465 nm, for example.

As illustrated in FIG. 3B, the flat plate 26c that forms the blue reflection region A3 includes a transmissive diffusion surface 261 that diffuses the excitation light, a transmissive layer 262 that transmits the excitation light, and a reflection surface 263 that reflects the excitation light. In the flat plate 26c, one side surface serves as the transmissive diffusion surface 261, and the other side surface facing the transmissive diffusion surface 261 serves as the reflection surface 263. The flat plate 26c is made of a BK7 glass plate, silica glass with high thermal conductivity, sapphire, artificial synthetic glass, or the like.

The transmissive diffusion surface 261 of the flat plate 26c if formed by performing roughing processing on a glass surface. For example, as the roughing processing, a processing technique for obtaining frosted glass, such as etching using sandblasting or a solvent, may be used. Further, the transmissive diffusion surface 261 of the flat plate 26c may be formed by using a minute prism or a microlens. Meanwhile, the transmissive diffusion surface in this example indicates a surface in which light is not deflected in a certain direction at an interface, but the light is transmitted such that a light flux travels while being spread to some extent.

It is sufficient to form the reflection surface 263 of the flat plate 26c by a conventional method for forming a normal mirror. For example, it may be possible to form a thin film using metal, such as aluminum, by vapor deposition or sputtering and then form the flat plate 26c. Further, it may be possible to form, on the flat plate 26c, a reflective film such that reflectance in the wavelength region of the excitation light is increased. Meanwhile, the reflective film is a thin film, and therefore, a thickness of the reflective film is almost negligible. Specifically, it may be possible to form the flat plate 26c from a dielectric multilayer film for which a mass production method is established.

As illustrated in FIG. 3B, when the blue laser light transmits through the transmissive diffusion surface 261 of the flat plate 26c, a light flux is spread at a certain angle from a main light beam. As illustrated in FIG. 3B, the spread light flux transmits through the flat plate 26c, and reaches the reflection surface 263 that faces the transmissive diffusion surface 261. The light flux that has transmitted through the flat plate 26c is specularly reflected by the reflection surface 263, reaches the incident surface (the transmissive diffusion surface 261) again, and is output from the flat plate 26c while being further spread at a certain angle. The flat plate 26c is set such that the light flux is spread at a minute angle from the transmissive diffusion surface 261 when the light flux is output. It is preferable that the spread angle is several degrees, may be in a range of about several degrees to 10 degrees, and may be about 20 degrees at most. The blue laser light basically passes through the transmissive diffusion surface 261 of the flat plate 26c twice. Therefore, the light flux that is reflected by the reflection surface 263 of the flat plate 26c is output by being diffused at about twice a diffusion angle of the transmissive diffusion surface 261. Consequently, it is sufficient to set the diffusion angle of the transmissive diffusion surface 261 of the flat plate 26c such that the diffusion angle is about a half of a desired diffusion angle for the reflected light. Therefore, when light is to be diffused at a desired angle, it is sufficient to set a diffusion angle that is about a half of the desired diffusion angle, so that it is possible to easily form the transmissive diffusion surface 261.

Thus, the blue laser light that enters the reflection surface 263 of the flat plate 26c at a certain angle passes through the transmissive diffusion surface 261 with a minute diffusion angle twice, and therefore is optimized such that the light flux is spread in a desired manner.

Here, the need of diffusion of the excitation light that is the blue laser light will be described. To implement the projector 1 with practical brightness, brightness of several thousand lumens is needed. For this reason, the excitation light needs power of several dozen watts (W) at minimum. As a light source with power of several dozen W, the laser light source 21 having a blue wavelength range is favorable. As the laser light source 21, what is called a laser diode is used. However, while the laser diode is an effective light source that can achieve high output power, directivity of light is high and coherency is high, so that glitter, which is a situation called speckle, is likely to occur in a projected image. To eliminate the situation as described above, by causing the laser light to pass through the diffusion member, it is possible to reduce the directivity and reduce coherence. To reduce the speckle as described above, it is common to arrange a diffusion plate in an optical path of the laser light; however, in the present embodiment, the transmissive diffusion surface 261 is arranged in a condensing optical path toward the fluorescent substance (in the vicinity of the condensing point) to reduce the speckle.

Furthermore, as illustrated in FIG. 3B, a position of the transmissive diffusion surface 261 of the flat plate 26c that is located closest when viewed in an incident direction of the blue laser light serves as a light emission position of a blue light source that is reflected by the reflection surface 263 of the flat plate 26c for capturing and use by the optical system in a subsequent stage.

Figure 4A:
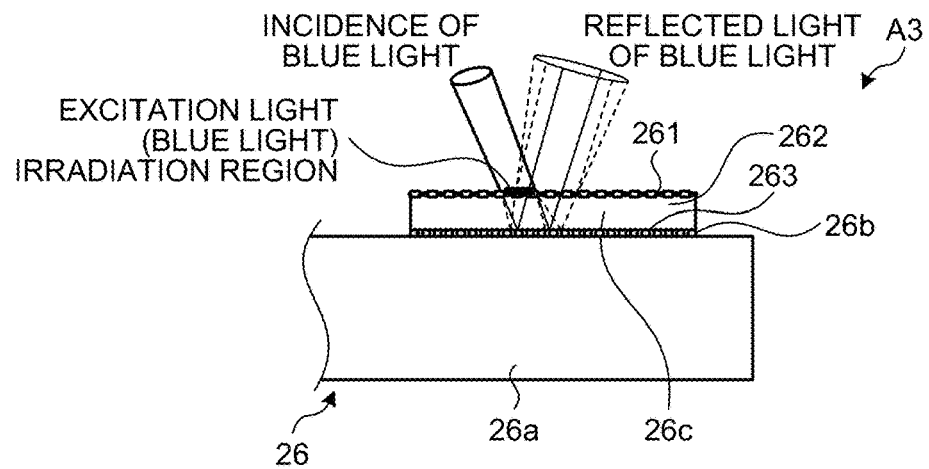
FIGS. 4A to 4C are diagrams illustrating an example of reflection in the wavelength conversion element.
Figure 4B:
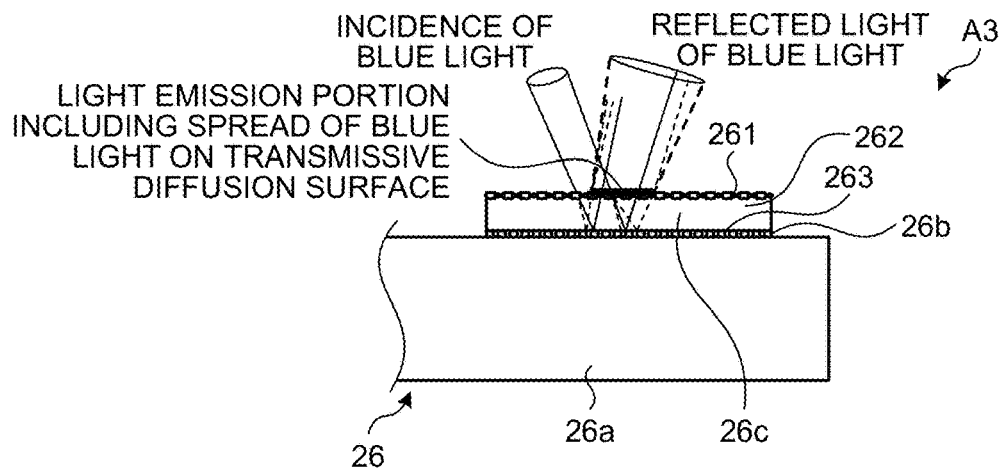
Figure 4C:
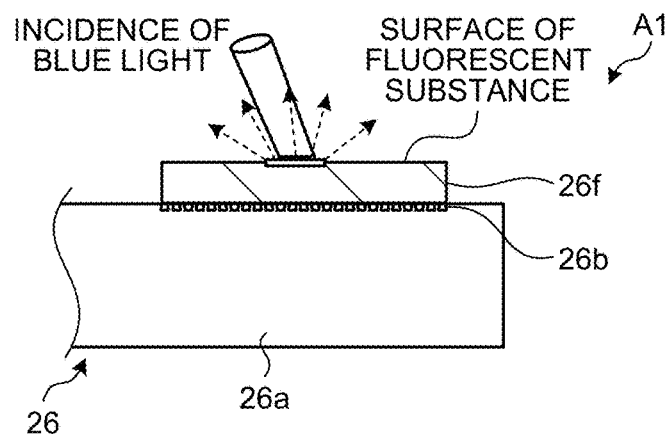

FIGS. 4A to 4C are diagrams illustrating an example of reflection in the wavelength conversion element 26. FIG. 4A illustrates a state in which the blue laser light enters the blue reflection region A3, FIG. 4B illustrates a state in which the blue laser light is diffused and reflected by the blue reflection region A3, and FIG. 4C illustrates a state in which the blue laser light enters the fluorescent substance region (the yellow fluorescent substance region A1 and the green fluorescent substance region A2) and fluorescence is emitted.

As illustrated in FIG. 4A and FIG. 4B, if the blue laser light enters the blue reflection region A3 of the wavelength conversion element 26 in an oblique direction, a spot size of the blue laser light formed on the transmissive diffusion surface 261 (excitation light irradiation region) is diffused by the transmissive diffusion surface 261' of the flat plate 26c, and reflected by the reflection surface 263 of the flat plate 26c. Therefore, the diffused light is spread, the light flux that has been reflected by the reflection surface 263 of the flat plate 26c enters the transmissive diffusion surface 261 again from a back side, secondly passes through the transmissive diffusion surface 261, and is output with a larger condensing spot on the transmissive diffusion surface 261 than the condensing spot at the time of first incidence.

In contrast, as illustrated in FIG. 4C, if the wavelength conversion element 26 rotates and the blue laser light is input, in an oblique direction, to the fluorescent substance region (the yellow fluorescent substance region A1 and the green fluorescent substance region A2) of the wavelength conversion element 26 that is indicated by a cross section taken along C-C' in FIG. 3A, the blue laser light serves as the excitation light. Meanwhile, the fluorescent substance region (the yellow fluorescent substance region A1 and the green fluorescent substance region A2) is formed on a reflection surface 26d on the base 26a in the wavelength conversion element 26. In this case, surfaces of the fluorescent substances 26f and 26g in the fluorescent substance region (the yellow fluorescent substance region A1 and the green fluorescent substance region A2) emit fluorescence that is slightly spread. In this manner, a light emission size of the excitation light that is emitted from the blue reflection region A3 on the transmissive diffusion surface 261 approaches or becomes the same size as a light source size of the fluorescence that is spread in the fluorescent substance region (the yellow fluorescent substance region A1 and the green fluorescent substance region A2).

If the configuration as described above is not adopted, diffused light for which a spot size of the condensing spot is reduced is obtained, so that light is emitted as if the blue light was emitted on the transmissive diffusion surface 261, and the light is captured with the small light emission size by the light homogenizing element 30 and applied to the panel. In this case, in an illumination optical system that is designed while giving priority to the light emission size of fluorescence, there is a problem in that it is difficult to equalize the light with the small light emission size for blue.

Referring back to FIGS. 3A to 3C, FIG. 3C is a developed view of a cross section taken along B-B' in FIG. 3A. As illustrated in FIG. 3C, the blue reflection region A3 includes the transmissive diffusion surface 261 for diffusing the excitation light, the transmissive layer 262, and the reflection surface 263.

The wavelength conversion element 26 is formed by consecutively connecting the yellow fluorescent substance region A1, the green fluorescent substance region A2, and the blue reflection region A3 in a ring shape. The yellow fluorescent substance region A1, the green fluorescent substance region A2, and the blue reflection region A3 are adjacent to one another because they are consecutively formed in a ring shape. Specifically, as illustrated in FIG. 3C, when the cross section B-B' along a circular arc is developed, the blue reflection region A3 and the yellow fluorescent substance region A1 consecutively follow the green fluorescent substance region A2. By consecutively arranging the yellow fluorescent substance region A1, the green fluorescent substance region A2, and the blue reflection region A3 as described above, when the condensing spot passes through a boundary portion between the regions, it is possible to minimize a time taken to across the two regions. With this configuration, it is possible to reduce an optical loss caused by what is called a spoke time.

Furthermore, as illustrated in FIG. 3C, the transmissive diffusion surface 261 of the blue reflection region A3 is in a position separate, toward a direction from which the excitation light is incident, from the surfaces on the base 26a side, of the fluorescent substances 26f and 26g that constitute the fluorescent substance region (the yellow fluorescent substance region A1 and the green fluorescent substance region A2) serving as the wavelength conversion member. More specifically, in the example illustrated in FIG. 3C, a height of the blue reflection region A3 is higher than heights of the yellow fluorescent substance region A1 and the green fluorescent substance region A2. Namely, the transmissive diffusion surface 261 that is formed in the blue reflection region A3 is located closer to the excitation light source than the surfaces of the yellow fluorescent substance region A1 and the green fluorescent substance region A2, as viewed in the incident direction. In other words, a distance between the base 26a and the transmissive diffusion surface 261 of the flat plate 26c has a limited value. Meanwhile, in this example, "high" represents a relative positional relationship.

In general, the yellow fluorescent substance region A1 and the green fluorescent substance region A2 of the wavelength conversion element 26 are coated, with limited thicknesses, on the surface of the base 26a. The yellow fluorescent substance region A1 and the green fluorescent substance region A2 formed on the base 26a have limited thicknesses, and therefore are inevitably separated from the surface of the base 26a.

Furthermore, this means that when a positional relationship between the surface of the blue reflection region A3 and the base 26a is determined, the position of the transmissive diffusion surface 261 of the flat plate 26c is at a limited distance toward the surface of the wavelength conversion element 26.

As illustrated in FIG. 3C, in the present embodiment, the height of the transmissive diffusion surface 261 of the flat plate 26c in the blue reflection region A3 is determined such that the following relationship is established, where the thickness of each of the yellow fluorescent substance region A1 and the green fluorescent substance region A2 is represented by k, and the height of the transmissive diffusion surface 261 of the flat plate 26c in the blue reflection region A3 from the surface of the base 26a is represented by h.

$k < h < 2k$

Meanwhile, h of 2k indicates that the height corresponds to twice the thickness of each of the yellow fluorescent substance region A1 and the green fluorescent substance region A2.

Meanwhile, if the height h of the transmissive diffusion surface 261 of the flat plate 26c in the blue reflection region A3 from the surface of the base 26a is equal to or larger than twice the thickness of each of the yellow fluorescent substance region A1 and the green fluorescent substance region A2, approximately the same efficiency as the efficiency obtained in a case where h is zero is obtained, and the effect is reduced. In other words, to improve the efficiency as compared to the conventional technology, if the height h of the transmissive diffusion surface 261 of the flat plate 26c in the blue reflection region A3 from the surface of the base 26a is set in a certain range such that $k < h < 2k$, it is possible to remarkably improve light use efficiency.

Meanwhile, it is ideal that the surfaces of the yellow fluorescent substance region A1 and the green fluorescent substance region A2 have the same heights as the transmissive diffusion surface 261 of the flat plate 26c in the blue reflection region A3 (the same distances with respect to the second lens group 25), that is, h=k. However, the yellow fluorescent substance region A1 and the green fluorescent substance region A2 are made of different materials from that of the blue reflection region A3, and therefore, in a strict sense, a certain step may be generated in the course of manufacturing the wavelength conversion element 26. In the present embodiment, an acceptable range for the step is defined.

The transmissive diffusion surface 261 of the flat plate 26c in the blue reflection region A3 serves as a light emitting source as a secondary light source due to diffusion of the blue laser light that is the excitation light. In contrast, the yellow fluorescent substance region A1 and the green fluorescent substance region A2 performs wavelength conversion to obtain a longer wavelength than the blue excitation light. In other words, as for the wavelength that acts in the transmissive diffusion surface 261 of the flat plate 26c in the blue reflection region A3 and the wavelength that is emitted as fluorescence from the yellow fluorescent substance region A1 and the green fluorescent substance region A2, the wavelength that acts in the transmissive diffusion surface 261 of the flat plate 26c is shorter and chromatic aberration occurs to some extent. It is possible to reduce back focus by using the shorter wavelength makes, and therefore, it is possible to improve condensing efficiency. For example, the transmissive diffusion surface 261 of the flat plate 26c in the blue reflection region A3 is located at a height of about 0.3 millimeters (mm) (300 micrometers (μm)) from the surface of the base 26a, and each of the yellow fluorescent substance region A1 and the green fluorescent substance region A2 has a thickness of about 0.2 mm (200 μm).

Effects of the present embodiment will be described below.

Figure 5:
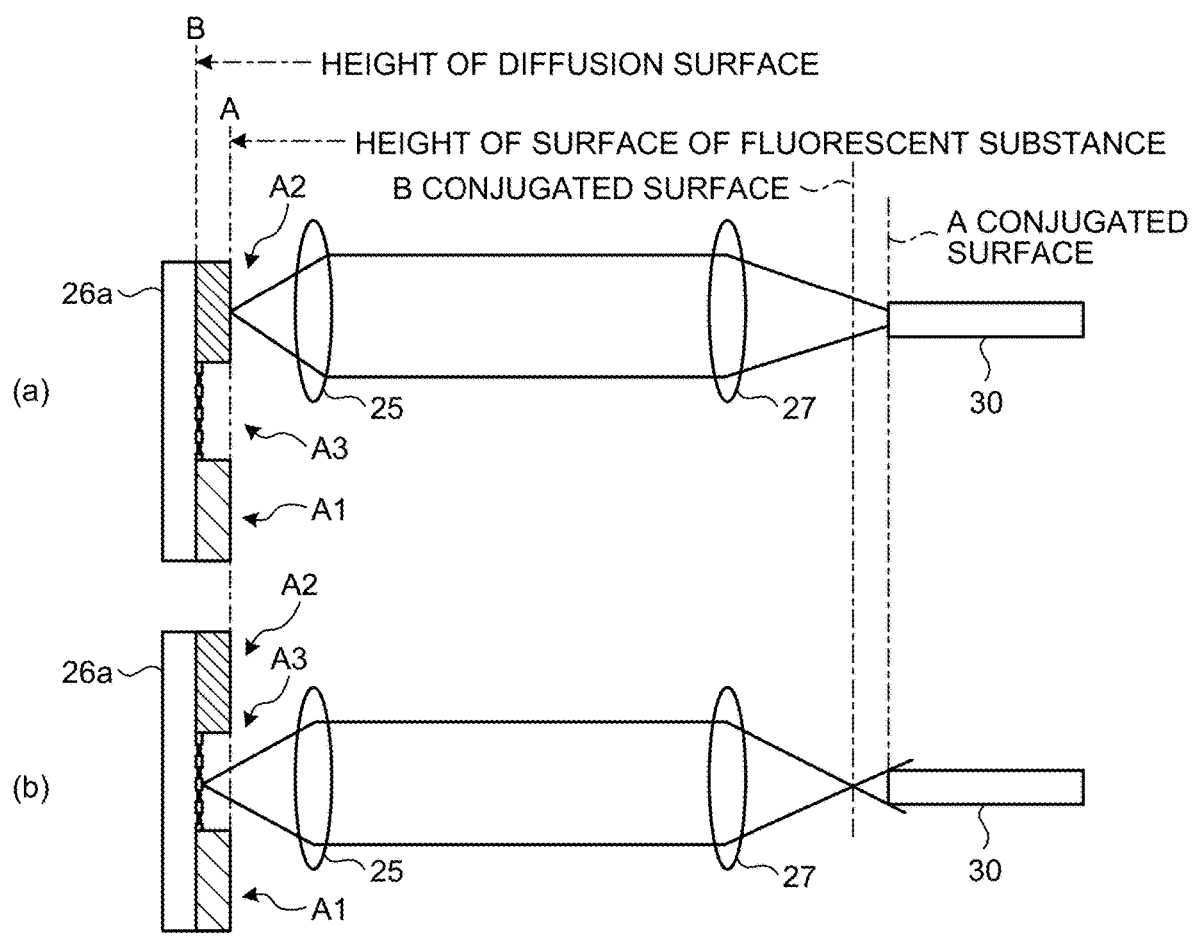
FIG. 5 is a schematic diagram illustrating a state in which light travels in a conventional wavelength conversion element.
Figure 6:
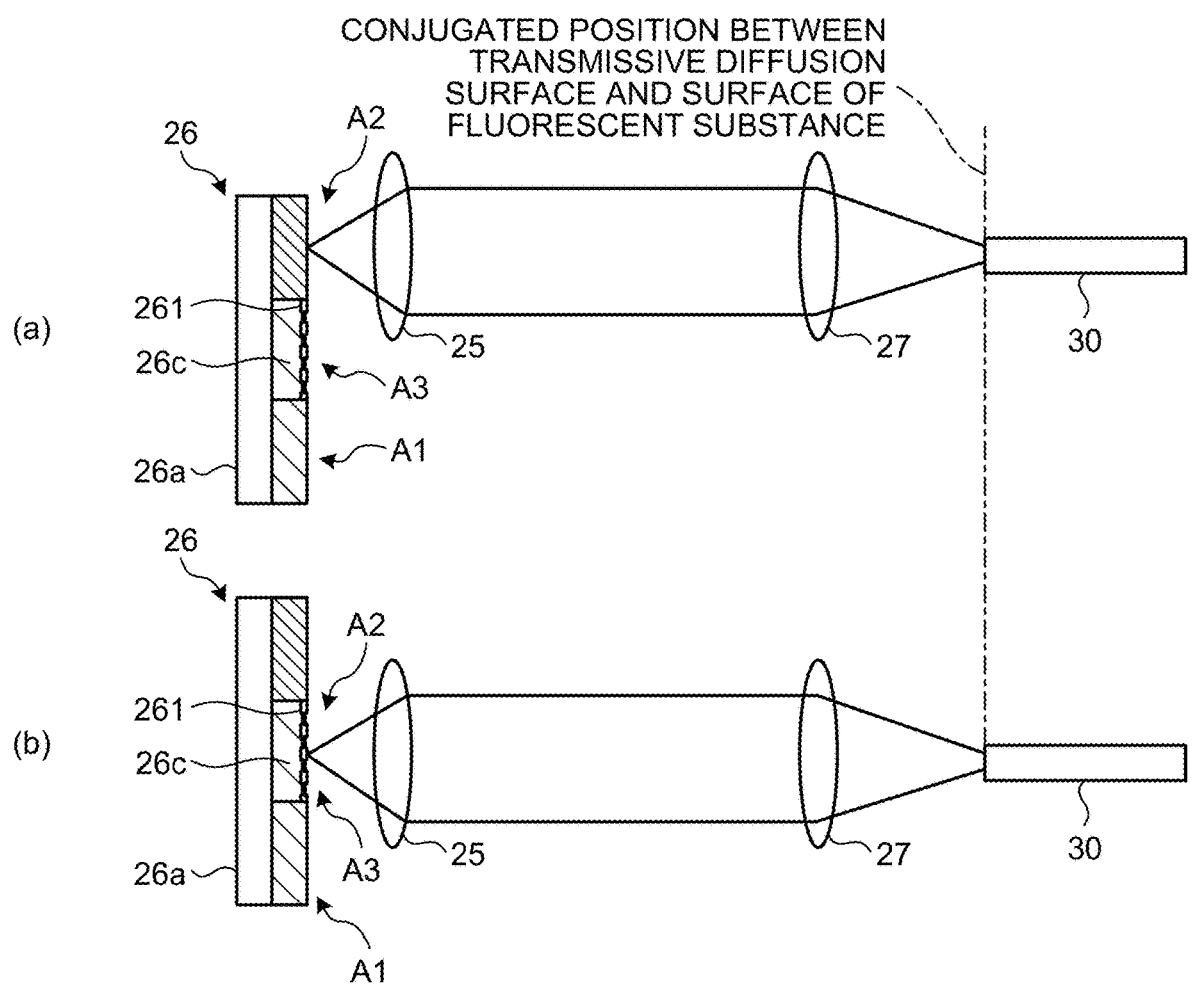
FIG. 6 is a schematic diagram illustrating a state in which light travels in the wavelength conversion element of the present embodiment.

FIG. 5 is a schematic diagram illustrating a state in which light travels in a conventional wavelength conversion element, and FIG. 6 is a schematic diagram illustrating a state in which light travels in the wavelength conversion element 26 of the present embodiment.

It is originally desirable that the surface of the fluorescent substance region (the yellow fluorescent substance region A1 and the green fluorescent substance region A2) and an inlet of the light homogenizing element 30, such as a light tunnel, have an optically conjugated relationship. In other words, an interval from a condensing element including the second lens group 25 and the third lens group 27 is determined and set such that the condensing spot of the excitation light located on the surface of the fluorescent substance region (the yellow fluorescent substance region A1 and the green fluorescent substance region A2) is minimized.

The fluorescence with a certain size corresponding to the size of the condensing spot is generated, and therefore, the size of the light source of the fluorescence is determined depending on the position of the wavelength conversion element 26. In other words, to efficiently use the fluorescence, it is desirable to reduce the condensing spot. Therefore, the wavelength conversion element 26 is arranged such that the excitation light forms the condensing spot as small as possible via the optical system. In general, the size of the condensing spot of the excitation light is about several mm, and in some cases, 1 mm or smaller than 1 mm.

As illustrated in FIG. 5, in the conventional technology, the diffusion surface is separated from the condensing element including the second lens group 25 and the third lens group 27 by a thickness of a fluorescent substance layer of the fluorescent substance region (the yellow fluorescent substance region A1 and the green fluorescent substance region A2). As illustrated in FIG. 5, when the excitation light is applied to the fluorescent substance region (the yellow fluorescent substance region A1 and the green fluorescent substance region A2) and fluorescence is emitted, a light emission point of the fluorescence serves as an object point (position A). The light emitted from the object point (position A) is condensed by the second lens group 25, and thereafter condensed by the third lens group 27 in the vicinity of the inlet of the light homogenizing element 30. In other words, the surface of the fluorescent substance region (the yellow fluorescent substance region A1 and the green fluorescent substance region A2) and the inlet of the light homogenizing element 30 are arranged so as to have an optically conjugated relationship.

As illustrated in FIG. 5, if the conventional wavelength conversion element rotates and the excitation light is reflected by the diffusion surface, the diffusion surface has a certain positional relationship (position B) so as to be separated from the condensing element including the second lens group 25 and the third lens group 27. In this state, a position at which the conjugated relationship is obtained with respect to the position B is, as illustrated in FIG. 5, located forward relative to the inlet of the light homogenizing element 30. In this state, the blue laser light that is folded and reflected by the diffusion surface reaches the inlet of the light homogenizing element 30 as a spread light flux, so that light that is not captured by the light homogenizing element 30 exists to some extent, which leads to decrease in the light use efficiency.

In contrast, as illustrated in FIG. 6, if the wavelength conversion element 26 of the present embodiment is adopted, the position of the surface of the fluorescent substance region (the yellow fluorescent substance region A1 and the green fluorescent substance region A2) and the position of the transmissive diffusion surface 261 of the flat plate 26c in the blue reflection region A3 are approximately aligned, so that it is possible to align the optically conjugated position at the inlet of the light homogenizing element 30, it is possible to maintain an optimal positional relationship for both of the fluorescence and the blue light, and it is possible to reduce an optical loss.

In this manner, according to the present embodiment, the transmissive diffusion surface 261 of the blue reflection region A3 is located at a higher position than the surface including the back surface of the fluorescent substance region (the yellow fluorescent substance region A1 and the green fluorescent substance region A2) that serves as the wavelength conversion member, so that it is possible to set a light source size of the excitation light, which serves as the secondary light source on the transmissive diffusion surface 261 upon application of the excitation light to the transmissive diffusion surface 261, to a certain size that is close to a light emission size that is spread in the conversion region. Consequently, it is possible to achieve the same use efficiency between the light that is subjected to wavelength conversion in the conversion region and the light that is captured from the excitation light.

Furthermore, the transmissive diffusion surface 261 of the blue reflection region A3 is in a position separate from the surface of the fluorescent substance region (the yellow fluorescent substance region A1 and the green fluorescent substance region A2) toward a direction from which the excitation light is incident, so that it is possible to set the transmissive diffusion surface 261 at a position closer to the surface of the fluorescent substance region (the yellow fluorescent substance region A1 and the green fluorescent substance region A2). Consequently, it is possible to efficiently use, as illumination light, both of the light subjected to the wavelength conversion and the reflected light of the excitation light. More specifically, the blue light as the excitation light is diffused by the transmissive diffusion surface 261, and the transmissive diffusion surface 261 serves as the light emitting source as the secondary light source. In contrast, the wavelength of the fluorescence is converted to a longer wavelength than the blue excitation light. In other words, as for the wavelength that acts in the transmissive diffusion surface 261 and the wavelength that is emitted as the fluorescence, the wavelength that acts in the transmissive diffusion surface 261 is shorter and chromatic aberration occurs. It is possible to reduce back focus by using the shorter wavelength makes, and therefore, it is possible to improve condensing efficiency.

In other words, according to the projector 1 of the present embodiment, blue of the laser diode light source is output and used as it is as the blue light, but the blue light passes through the transmissive diffusion surface 261 of the blue reflection region A3 twice, so that it is possible to ensure homogeneity and alleviate reduction in speckle of the laser light, and it is possible to obtain a projection image with high quality.

Meanwhile, in the present embodiment, assuming that the thickness of each of the yellow fluorescent substance region A1 and the green fluorescent substance region A2 is represented by k and the height of the transmissive diffusion surface 261 of the flat plate 26c in the blue reflection region A3 from the surface of the base 26a is h, the height of the transmissive diffusion surface 261 of the flat plate 26c in the blue reflection region A3 is determined such that the following relationship is obtained.

$k<h<2k$

However, embodiments are not limited to this example, and it may be possible to set the height such that $0<h<2k$. In the conventional technology, the transmissive diffusion surface 261 is separated from the surface of the fluorescent substance layer by the thickness of the fluorescent substance layer when viewed from the condenser lens. That is, the position at which h=0 is adopted. As compared to this state, if the transmissive diffusion surface 261 is located closer to the condenser lens, that is, if the height is set such that h>0, it is possible to adjust a focus at a closer position to the fluorescent surface and it is possible to improve light use efficiency of an illumination device that uses the light subjected to the wavelength conversion (fluorescence) and the excitation light as the blue light.

Furthermore, the transmissive diffusion surface 261 of the flat plate 26c in the blue reflection region A3 may be located at the same position as the surfaces of the yellow fluorescent substance region A1 and the green fluorescent substance region A2 when viewed from the direction from which the excitation light is incident. In other words, assuming that the thickness of each of the yellow fluorescent substance region A1 and the green fluorescent substance region A2 is represented by k and the height of the transmissive diffusion surface 261 of the flat plate 26c in the blue reflection region A3 from the surface of the base 26a is represented by h, it may be possible to determine the height of the transmissive diffusion surface 261 of the flat plate 26c in the blue reflection region A3 such that the following relationship is obtained.

$k=h$

A distance (back focus) to the second lens group 25 for capturing the fluorescence and the diffused light is extremely small. In contrast, if the wavelength conversion element 26 is rotated, the surface of the second lens group 25 moves above the wavelength conversion element 26 at a high speed while maintaining the minute gap. Therefore, by eliminating a step on the wavelength conversion element 26, it is possible to prevent wind noise or physical obstacles.

Meanwhile, it does not mean that the transmissive diffusion surface 261 can be separated from the base 26a without a limit. If there is an ideal focal position, in general, as a general optical design in which robust is taken into account, it is designed to achieve optimization at the ideal focal position. For example, in the conventional technology, if optimization is performed at the position on the fluorescent surface, certain efficiency for capturing the reflected light by the transmissive diffusion surface 261 is ensured even at a distance of +k (corresponding to the thickness of the yellow fluorescent substance region A1 and the green fluorescent substance region A2) that is set back when viewed from the condenser lens. If a special design is not performed, it is normally likely that approximately the same performance as performance at an original position located at the distance of +k is obtained (it is normal that characteristics are targets with respect to deviation of the focal point) even if the focal point is moved forward in an opposite direction by −k. With use of the technical idea of the present invention, only by setting the transmissive diffusion surface 261 such that the transmissive diffusion surface 261 is located within Δk (smaller than ±k) from the fluorescent surface, it is possible to further improve the efficiency as compared to at least the conventional technology without a need of a special devise in the design. Therefore, by setting the height of the transmissive diffusion surface 261 such that 0<h<2k, the transmissive diffusion surface 261 is located within a deviation of ±k relative to the height from the fluorescent surface, so that it is possible to improve the efficiency as compared to the positon at which h=0.

Modification

A modification will be described below.

Figure 7A:
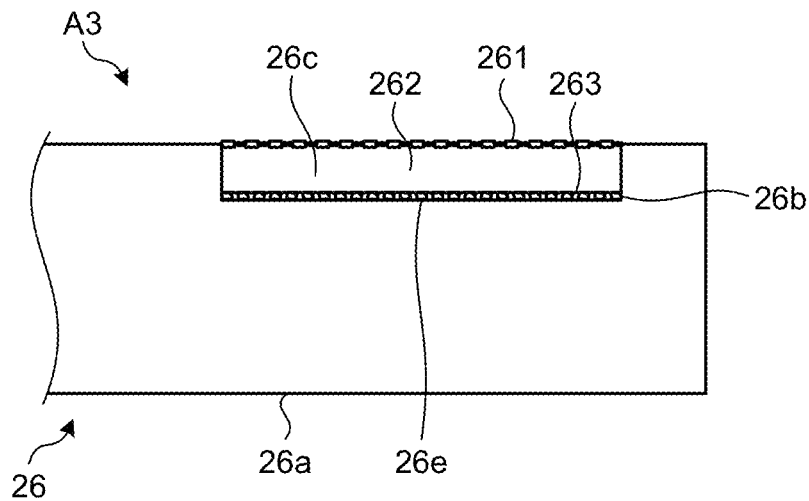
FIGS. 7A and 7B are diagrams illustrating a cross section of a wavelength conversion element according to a modification.
Figure 7B:
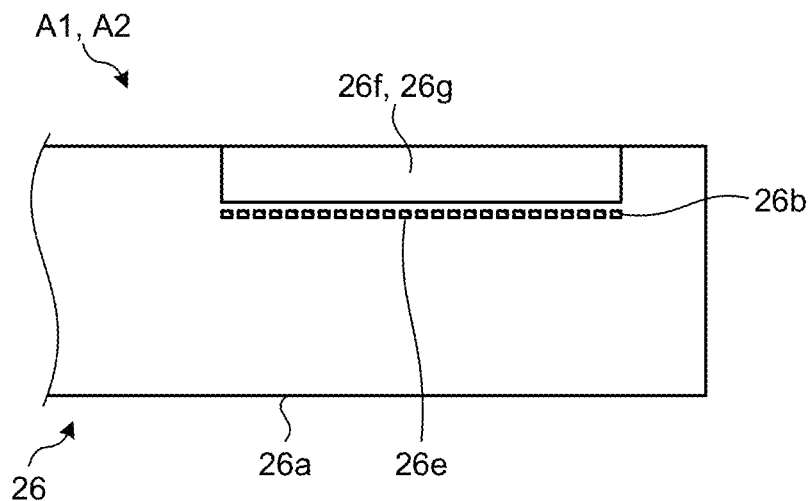

FIGS. 7A and 7B are diagrams illustrating a cross section of the wavelength conversion element 26 according to the modification. FIG. 7A is a cross-sectional view of the blue reflection region A3, and FIG. 7B is a cross-sectional view of the fluorescent substance region (the yellow fluorescent substance region A1 and the green fluorescent substance region A2).

As illustrated in FIGS. 7A and 7B, the wavelength conversion element 26 of the modification includes a groove 26e in the form of a circle or a circular arc along an outer periphery of the base 26a. In the wavelength conversion element 26, the yellow fluorescent substance region A1, the green fluorescent substance region A2, and the blue reflection region A3 are formed in the groove 26e that is formed in the base 26a. As illustrated in FIGS. 7A and 7B, a bottom surface of the groove 26e that comes into contact with the yellow fluorescent substance region A1, the green fluorescent substance region A2, and the blue reflection region A3 serves as a surface of the base 26a, and the transmissive diffusion surface 261 of the flat plate 26c is located while maintaining a limited distance from the bottom surface of the groove 26e.

Second Embodiment

A second embodiment will be described below.

The second embodiment is different from the first embodiment in that the light that has transmitted through the flat plate 26c in the blue reflection region A3 is reflected by the surface of the base 26a in the wavelength conversion element 26. In the following description of the second embodiment, explanation of the same components as those of the first embodiment is omitted, and differences from the first embodiment will be described.

Figure 8:
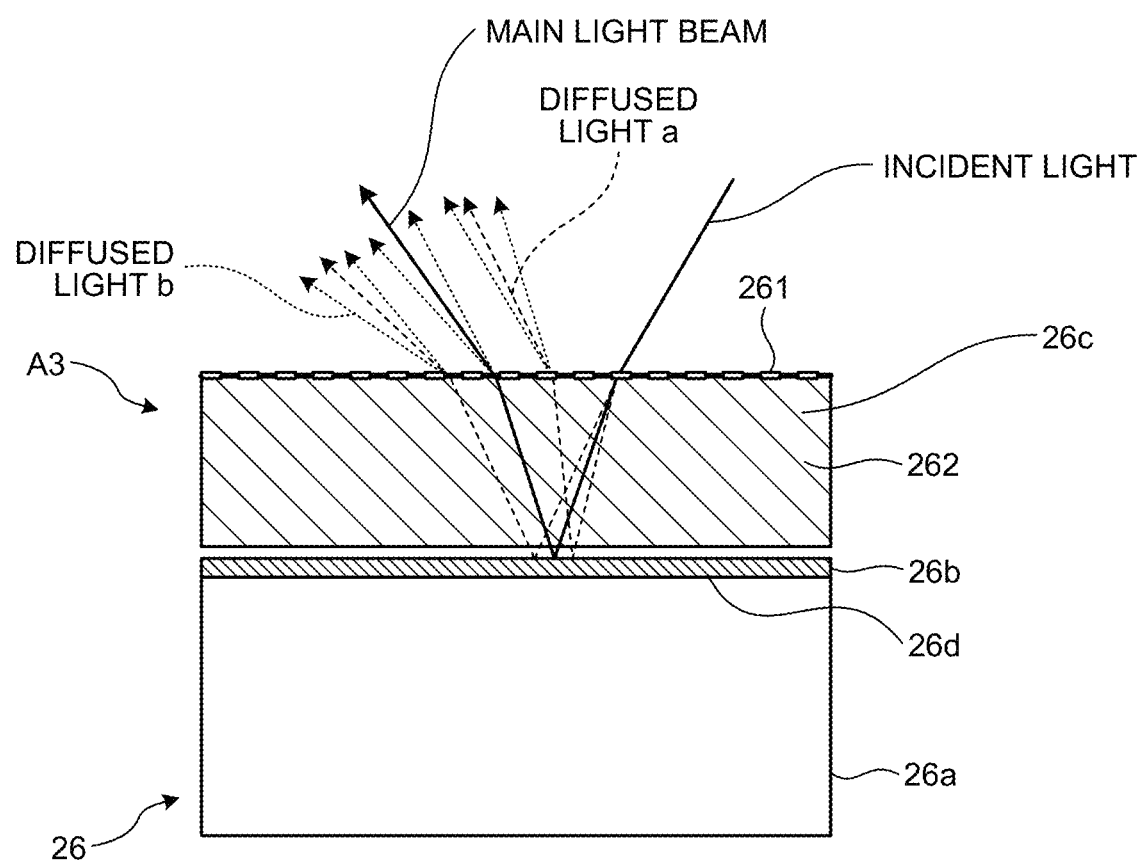
FIG. 8 is a developed view of a cross section of a wavelength conversion element according to a second embodiment.

FIG. 8 is a developed view of a cross section of the wavelength conversion element 26 according to the second embodiment. In FIG. 3B, only the state of diffusion at the outermost surface is illustrated; however, as an actual behavior of light, as illustrated in FIG. 8, the light is spread at a diffusion angle from a main light beam on the transmissive diffusion surface 261 of the flat plate 26c in the blue reflection region A3, is reflected by the reflection surface 263 of the flat plate 26c, and is further diffused when traveling through the transmissive diffusion surface 261 in the opposite direction.

Therefore, as illustrated in FIG. 8, in the wavelength conversion element 26 according to the present embodiment, the surface of the flat plate 26c serves as the transmissive diffusion surface 261, the other surface facing the transmissive diffusion surface 261 is formed as a transparent surface, and light is reflected by the surface of the base 26a. The flat plate 26c is attached to the surface of the base 26a serving as the reflection surface 26d via the bonding layer 26b that has a transparent surface opposite to the transmissive diffusion surface 261.

In the wavelength conversion element 26, the fluorescent substance region (the yellow fluorescent substance region A1 and the green fluorescent substance region A2) is formed on the reflection surface 26d of the base 26a, so that it is possible to form the reflection surface 26d in a continuous manner as a reflection surface for the excitation light (blue light). In other words, it is not necessary to arrange a reflective layer in the flat plate 26c, so that it is possible to construct the wavelength conversion element 26 at low cost.

Meanwhile, to achieve practical illumination output power, in general, the blue laser light source needs to have output power of several dozen W. The spot light at several dozen W passes through the transmissive diffusion surface 261 of the flat plate 26c in a concentrated manner, and therefore, the flat plate 26c needs to be heat resistant to some extent. Therefore, it is sufficient that the flat plate 26c is thermally connected to at least a certain member, such as metal, with high thermal conductivity. In other words, by connecting the flat plate 26c to the base 26a via the bonding layer 26b, it is possible to dissipate heat caused by irradiation, so that it is possible to provide the wavelength conversion element 26 with high reliability.

Meanwhile, in each of the embodiments, the wavelength conversion element 26 as the wavelength conversion plate is arranged in the projector (image projection apparatus) 1, but embodiments are not limited to this example, and the wavelength conversion element 26 may be widely adopted to a device that obtains white appearance by temporally mixing the fluorescence and the blue excitation light source. For example, the wavelength conversion element 26 as the wavelength conversion plate may be applied to an illumination device, such as a search light or a spot light.

Third Embodiment

A third embodiment will be described below.

The third embodiment is different from the first embodiment and the second embodiment in that a range in the incident direction of the excitation light is defined. In the following description of the third embodiment, explanation of the same components as those of the first embodiment and the second embodiment is omitted, and differences from the first embodiment and the second embodiment will be described.

If the excitation light is input along a direction (moving direction) in which the conversion region (the yellow fluorescent substance region (first wavelength conversion region) A1, the green fluorescent substance region (second wavelength conversion region) A2) and the reflection region (the blue reflection region A3) rotate, there is a problem in that beam is spread in the moving direction. To cope with this, in the present embodiment, the excitation light emitted from the laser light source 21 is input in a range of 45° to 135° with respect to the moving direction (rotation direction) of the wavelength conversion element 26.

Figure 9:
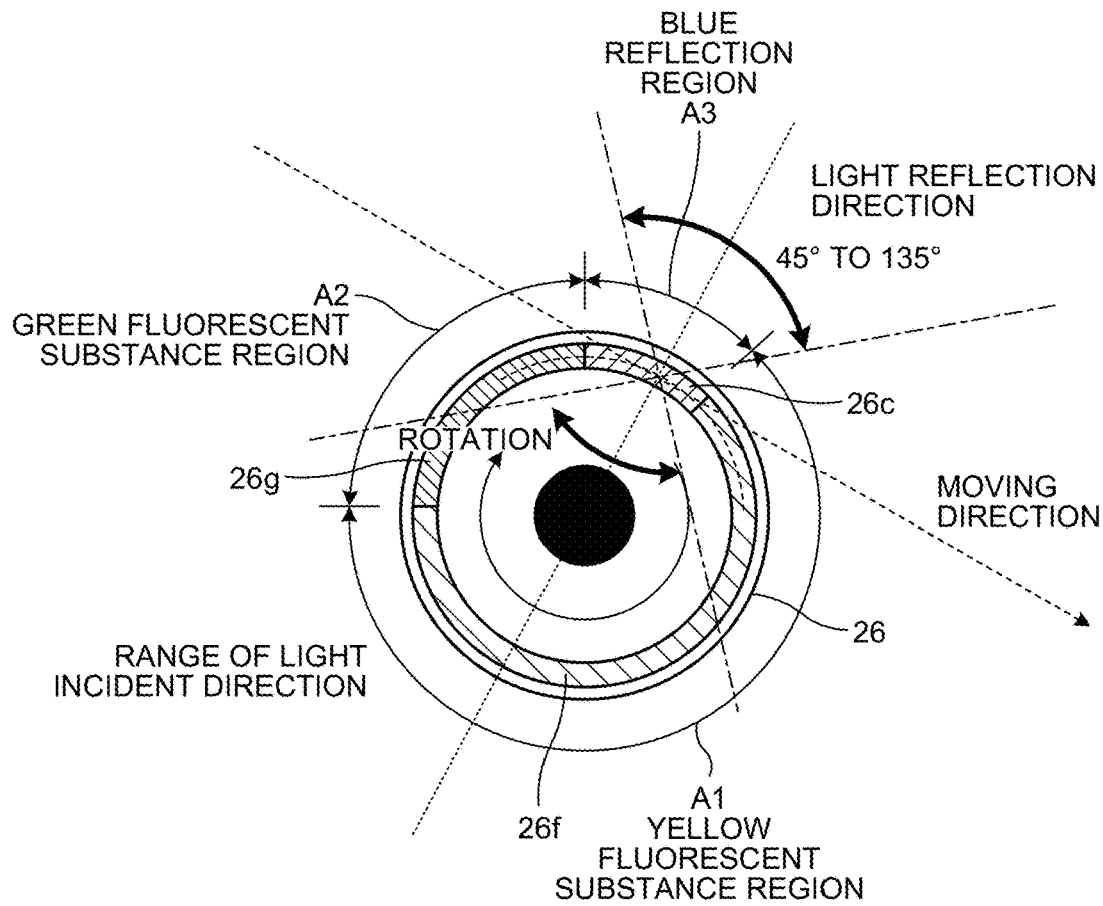
FIG. 9 is a diagram illustrating a range of an incident direction of excitation light according to a third embodiment.

FIG. 9 is a diagram illustrating a range of the incident direction of the excitation light according to the third embodiment. A dashed arrow P illustrated in FIG. 9 is a tangent of the wavelength conversion element 26 for drive (rotation direction). The incident direction of the excitation light emitted from the laser light source 21 is falls within a range of 45° to 135° (that may be either from above or below) with respect to the direction along the tangent illustrated in FIG. 9.

Figure 10:
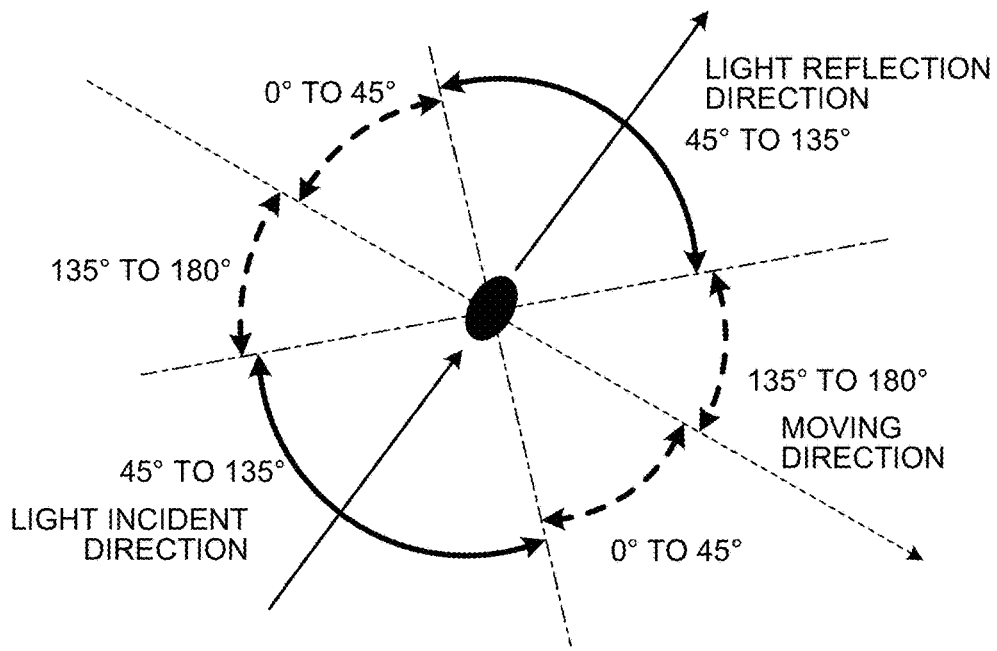
FIG. 10 is an enlarged diagram of an irradiation position of the excitation light.

FIG. 10 is an enlarged view of the irradiation position of the excitation light. The excitation light emitted from the laser light source 21 is incident in a range (45° to 135°) formed by two arrows Q illustrated in FIG. 10. An ellipse illustrated in FIG. 10 indicates the condensing spot of the excitation light. As illustrated in FIG. 10, the spot light is spread in a perpendicular direction with respect to the moving direction of the conversion region (the yellow fluorescent substance region (first wavelength conversion region) A1, the green fluorescent substance region (second wavelength conversion region) A2.

A case will be described below in which the excitation light emitted from the laser light source 21 is input in a direction in a range of 0° to 45° or 135° to 180° as illustrated in FIG. 10. In this case, the condensing spot of the excitation light is an ellipse with a long shaft in the incident direction, and in the direction in which the beam is spread, diffusion is increased and color mixture or light use efficiency is reduced. The spread of light occurs in the same manner as described above with reference to FIGS. 3A to 3C, FIGS. 4A to 4C, etc.

In this manner, according to the present embodiment, the beam is spread in the conversion region (the yellow fluorescent substance region (first wavelength conversion region) A1, the green fluorescent substance region (second wavelength conversion region) A2); however, because the incident direction of the excitation light in the reflection region is defined as being at an angle equal to or larger than 45 degrees and equal to or smaller than 135 degrees, it is possible to minimize the spread at the boundary portion between the reflection region and the conversion region. In particular, if the incident direction of the excitation light with respect to the reflection region is set to about 90 degrees, the spread in the moving direction is minimized, so that it is possible to reduce spread of a spoke portion and obtain a highly efficient illumination optical system.

Meanwhile, in each of the embodiments as described above, preferable embodiments of the present invention have been described, but the present invention is not limited to the details of the embodiments.

In particular, specific shapes and values of each of the portions illustrated in each of the embodiments as described above are mere examples for embodiments for carrying out the present invention, and the technical scope of the present invention need not be interpreted in a limited manner.

As described above, the present invention is not limited to the details of each of the embodiments as described above, and may be modified appropriately within the scope that does not depart from the gist of the present invention.

According to an embodiment, it is possible to set a light source size of the excitation light, which serves as a secondary light source on a transmissive diffusion surface upon application of the excitation light to the transmissive diffusion surface, to a certain size that is close to a light emission size that is spread in the conversion region, and therefore, it is possible to improve use efficiency of light that is subjected to wavelength conversion in the conversion region and light that is captured from the excitation light.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. A wavelength conversion plate comprising:
a conversion region on a base surface, the conversion region including a wavelength converter to receive excitation light and generate a color different from a color of the excitation light; and
a reflection region on the base surface, the reflection region to reflect the excitation light, wherein:
the reflection region includes:
a transmissive diffusion surface to diffuse the excitation light;
a transmissive layer to transmit the excitation light; and
a reflection surface to reflect the excitation light,
the transmissive diffusion surface is in a position separate from a surface closer to the base surface, of the wavelength converter, toward a direction from which the excitation light is incident,
the reflection region includes a transparent flat plate,
the transmissive diffusion surface is on a first surface of the transparent flat plate, and
a second surface facing the transmissive diffusion surface of the transparent flat plate comes into contact with the base surface or thermally connected to the base surface via a bonding layer.

2. The wavelength conversion plate according to claim 1, wherein a position of the transmissive diffusion surface is determined such that a condition $$k<b<2k$$

is satisfied, where k represents a thickness of the wavelength converter and h represents a distance between the base surface and the transmissive diffusion surface.

3. The wavelength conversion plate according to claim 1, wherein a position of the transmissive diffusion surface is determined such that a relation $$0<h<2k$$

is satisfied, where k represents a thickness of the wavelength converter and h represents a distance between the base surface and the transmissive diffusion surface.

4. The wavelength conversion plate according to claim 1, wherein a position of the transmissive diffusion surface is determined such that a relation $$k=h$$

is satisfied, where k represents a thickness of the wavelength converter and h represents a distance between the base surface and the transmissive diffusion surface.

5. The wavelength conversion plate according to claim 1, wherein the second surface facing the transmissive diffusion surface, of the transparent flat plate is to reflect the excitation light.

6. The wavelength conversion plate according to claim 1, wherein the second surface facing the transmissive diffusion surface, of the transparent flat plate is to transmit the excitation light.

7. A light source device comprising:
the wavelength conversion plate according to claim 1;
a light source to emit the excitation light; and
a condensing optical system to condense the excitation light onto the wavelength conversion plate.

8. The light source device according to claim 7, wherein:
the excitation light emitted by the light source is blue light, and
the wavelength conversion plate is to receive the blue light and convert a wavelength of the blue light into a wavelength including at least a green light component and a red light component.

9. The light source device according to claim 7, wherein:
the wavelength conversion plate is configured to be moved by a motor, and
a direction in which the excitation light is incident on the conversion region and the reflection region is at an angle equal to or larger than 45 degrees and equal to or smaller than 135 degrees with respect to a moving direction of the wavelength conversion plate.

10. The light source device according to claim 9, wherein the direction in which the excitation light is incident on the conversion region and the reflection region is at an angle of about 90 degrees with respect to the moving direction of the wavelength conversion plate.

11. An image projection apparatus comprising:
the light source device according to claim 8;
a light homogenizing element to homogenize light emitted from the light source device and output the homogenized light;
an image display element to modulate the light from the light homogenizing element, to form an image; and
a projection optical system to enlarge the image and project the enlarged image on a projection target screen.

12. A wavelength conversion plate comprising:
a conversion region on a base surface, the conversion region including a wavelength converter to receive excitation light and generate a color different from a color of the excitation light; and
a reflection region on the base surface, the reflection region to reflect the excitation light, wherein:
the reflection region includes:
a transmissive diffusion surface to diffuse the excitation light;
a transmissive layer to transmit the excitation light; and
a reflection surface to reflect the excitation light,
the transmissive diffusion surface is in a position separate from a surface closer to the base surface, of the wavelength converter, toward a direction from which the excitation light is incident, and
a position of the transmissive diffusion surface is determined such that a condition $$k<h<2k$$

is satisfied, where k represents a thickness of the wavelength converter and h represents a distance between the base surface and the transmissive diffusion surface.

13. A light source device comprising:
the wavelength conversion plate according to claim 12;
a light source to emit the excitation light; and
a condensing optical system to condense the excitation light onto the wavelength conversion plate.

14. The light source device according to claim 13, wherein:
the excitation light emitted by the light source is blue light, and
the wavelength conversion plate is to receive the blue light and convert a wavelength of the blue light into a wavelength including at least a green light component and a red light component.

15. The light source device according to claim 13, wherein:
the wavelength conversion plate is to be moved by a motor, and,
a direction in which the excitation light is incident on the conversion region and the reflection region is at an angle equal to or larger than 45 degrees and equal to or smaller than 135 degrees with respect to a moving direction of the wavelength conversion plate.

16. A wavelength conversion plate comprising:
a conversion region on a base surface, the conversion region including a wavelength converter to receive excitation light and generate a color different from a color of the excitation light; and
a reflection region on the base surface, the reflection region to reflect the excitation light, wherein:
the reflection region includes:
a transmissive diffusion surface to diffuse the excitation light;
a transmissive layer to transmit the excitation light; and
a reflection surface to reflect the excitation light,
the transmissive diffusion surface is in a position separate from a surface closer to the base surface, of the wavelength converter, toward a direction from which the excitation light is incident,
a position of the transmissive diffusion surface is determined such that a relation $$0<h<2k$$

is satisfied, where k represents a thickness of the wavelength converter and h represents a distance between the base surface and the transmissive diffusion surface.

17. A light source device comprising:
the wavelength conversion plate according to claim 16;
a light source to emit the excitations light; and
a condensing optical system to condense the excitation light onto the wavelength conversion plate.

18. The light source device according to claim 17, wherein:
the excitation light emitted by the light source is blue light, and
the wavelength conversion plate is to receive the blue light and convert a wavelength of the blue light into a wavelength including at least a green light component and a red light component.

19. The light source device according to claim 17, wherein:
   the wavelength conversion plate is to be moved by a motor, and
   a direction in which the excitation light is incident on the conversion region and the reflection region is at an angle equal to or larger than 45 degrees and equal to or smaller than 135 degrees with respect to a moving direction of the wavelength conversion plate.

20. The light source device according to claim 19, wherein the direction in which the excitation light is incident on the conversion region and the reflection region is at an angle of about 90 degrees with respect to the moving direction of the wavelength conversion plate.

* * * * *